May 24, 1955  M. R. SIEBERT  2,708,806
FISH LURES
Filed March 25, 1950

INVENTOR.
MELVIN R. SIEBERT
BY *Alfred W. Petchaft*
ATTORNEY

United States Patent Office 2,708,806
Patented May 24, 1955

2,708,806

FISH LURES

Melvin R. Siebert, St. Louis, Mo.

Application March 25, 1950, Serial No. 151,962

2 Claims. (Cl. 43—42.33)

This invention relates in general to certain new and useful improvements in fish lures and, more particularly, to fluorescent catoptric fishing lures.

It is the primary object of the present invention to provide a fishing lure which is light in weight and yet is of relatively large size, so as to be visible at substantially great distances in the water and to be attractive to game fish.

It is a further object of the present invention to provide a fish lure which is simple in construction and relatively low in cost of manufacture.

It is an additional object of the present invention to provide a fish lure which is constructed of reflecting lens-like or light refractive materials, so combined, as to provide a unique catoptric effect when the lure is moved through water, thereby picking up the sunlight and ultra-violet rays which filter through the water from the surface and producing a brilliant optical effect highly attractive to game fish.

It is also an object of the present invention to provide a fish lure having fluorescent catoptric properties when immersed in water, so as to attract fish in a manner simulative of a live minnow.

It is an additional object of the present invention to provide a fluorescent catoptric fishing lure which is rugged and durable in use and will not readily break or become otherwise marred or damaged during rough handling and usage.

With the above and other objects in view, my invention resides in the novel features of form, construction, arrangement, and combination of parts presently described and pointed out in the claims.

In the accompanying drawings—

Figure 1 is a top plan view of a fishing lure constructed in accordance with, and embodying the present invention;

Figures 2, 3, 4, 5, and 6 are sectional views taken along lines 2—2, 3—3, 4—4, 5—5, and 6—6, respectively, of Figure 1;

Figure 1:
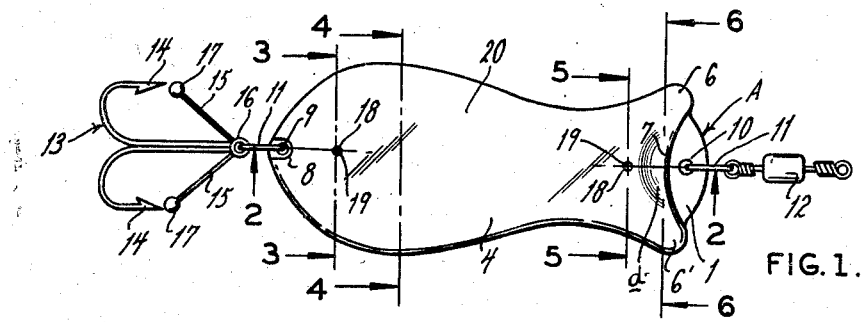
Figure 2:
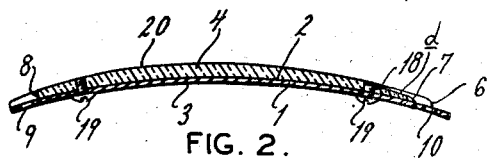
Figure 3:
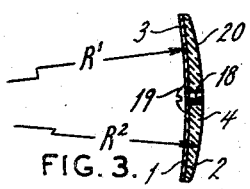
Figure 4:
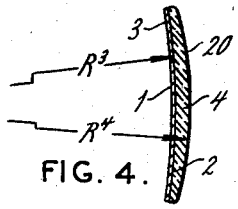
Figures 5, 6:
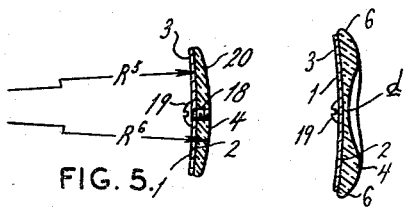

Referring now in more detail by reference characters to the drawings, which illustrate practical embodiments of the present invention, A designates a fluorescent catoptric lure comprising a base plate 1 formed of stainless steel or other suitable bright metallic material and peripherally shaped in rough simulation of the contours of a fish body. The inside surface 2 of the plate 1 is highly polished whereas the surface 3 of the plate may be polished or left in natural state but is nevertheless not particularly active as a reflective surface. The metallic plate is furthermore formed to a gentle curving arc throughout its longitudinal extent, substantially as shown in Figure 2, and is similarly curved as in the transverse direction as shown in Figures 3, 4, and 5. It will be noted that the radius of curvature in the forward portion, as indicated at $R^1$, is different from the radius of curvature at the midportion as indicated at $R^3$. Finally at the tail portion the radius of curvature is again different as indicated at $R^5$. It will be noted that the radius of curvature $R^3$ is much shorter than the radii of $R^1$ and $R^5$, and the radius of curvature $R^5$ is the longest radius of curvature. In other words, the concavity of the plate 1 is much greater in its central portion than at either end and is much flatter at the tail portion than elsewhere.

Formed of a fluorescent plastic material in any suitable color, such as Plexiglas (red fluorescent No. 2085, yellow fluorescent No. 2086, Rohm & Haas Co.), Fluorescent Acetate Sheet (red, yellow, blue, Monsanto Chem. Corp.) or Lucite-luminous Grade (Dupont Co.), is a top element 4 peripherally contoured for marginal registration with the plate 1 to resemble the body outlines of a fish except that it is somewhat widened at its rearward portion to protrude beyond the margin of the plate 1, as at 6, 6', and is inwardly curved between these protruding portions, as at 7, to simulate the tail of a natural fish. In its forward portion, the top element 1 is inwardly notched, as at 8, to provide clearance for an aperture 9 formed in the plate 1. Similarly the plate 1 is provided at its rearward portion with an aperture 10, which is aligned along the central longitudinal axis of the plate 1 with the aperture 9. Disposed through the apertures 9 and 10 are small rings 11 for respectively attaching a conventional leader swivel 12 and a hook 13, the latter consisting of a plurality of barbs 14, each barb being provided with a protector element comprising a straight length of spring wire 15 soldered or otherwise secured at one end to the shank of the hook 13 adjacent the eye 16 and terminating at its outer end in a small metallic ball 17 located just at the point of the barb 14. This protector element will readily yield when the hook is grabbed by the fish, so that the barbs will sink into the fish's mouth and become engaged. However, when the hook is dragged over weeds, sticks, stones, and other objects normally encountered in the water, the spring wire protector elements 15 will keep the hook from becoming entangled and will protect the points of the barbs from becoming dulled.

The top element 4 is provided with two threaded apertures 18, located along the longitudinal axis thereof, adjacent the forward and rearward ends for receiving small screws 19, which extend through the plate 1 and serve to attach the top element 4 securely in place. The top element 4, on its under surface, conforms snugly to the convex curvature of the top surface 2 of the plate 1, and on its upper surface 20 the top element 4 is curved along somewhat shorter radii of curvature so that it is relatively thin around its outer peripheral margins and becomes substantially thicker towards the center. Referring to Figures 3, 4, and 5 it will be noted that the radius of curvature $R^2$, is shorter than the radius of curvature of $R^1$. Similarly, the radius of curvature $R^4$ is shorter than the radius of curvature $R^3$. Finally the radius of curvature $R^6$ is shorter than the radius of curvature $R^5$. It should also be understood in this connection that the changes in radius of curvature are relatively uniform for the entire surface so that the outer surface 20 presents a smooth convex surface and the top element 4 thereby has the optical characteristics of a lens.

In use, when the fishing lure A is attached to a suitable line by the swivel 12 and pulled through the water it will oscillate laterally about its longitudinal axis through an arc of approximately 270° and, during this to-and-fro oscillating or rocking movement, the top element 4 will pick up sun rays filtering down through the water from the surface, transmitting those rays to the reflective surface 2 or plate 1, then the top element will diffuse and refract the reflected rays throughout its lens-like body to present a brilliant flashing effect, simulative of the play of light of the scales of a natural minnow. This optical effect has been found to be extremely attractive to game fish and renders the lure A unusually effective. It has actually been found that the travel or so-called "piping" of light through the body of the element 4 is such that the lure will have a brilliant optical effect even when substantially upside down in reference to the surface of the water. It should also be noted that the oscillating or rolling action of the lure A about its longitudinal axis as it is drawn through the water is the result of the contoured medial depression $d$ extending down through the middle of the tail portion of the element 4, as shown in Figure 6.

Figure 7:
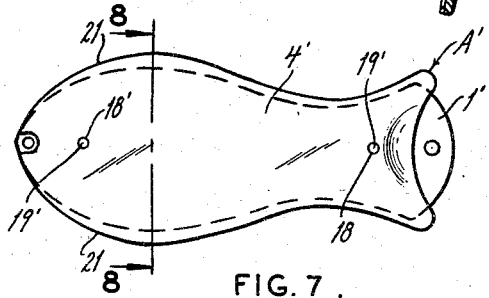
Figure 7 is a top plan view of a modified form of fishing lure constructed in accordance with, and embodying the present invention.

If desired, a modified form of lure A' may be provided substantially as shown in Figures 6 and 7, comprising a metallic plate 1' substantially identical to the previously described metallic plate 1. Bolted to the upper surface of the plate 1' by means of attachment screws 19' is a fluorescent plastic top element 4' similar to the previously described top element 4, having the same lens-like contours. The top element 4', however, is peripherally widened so that it projects outwardly beyond the peripheral contours of the plate 1 to form an overhanging transparent marginal band 21 on either side, substantially as shown in Figures 6 and 7. This overhanging band tends to produce brilliant lines of illumination which outlines the lure A' as it travels through the water and in the case of some types of game fish has an added attractive power or effect.

Figure 8:
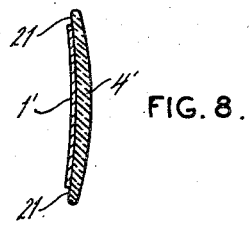
Figure 8 is a sectional view taken along line 8—8 of Figure 7.
Figure 9:
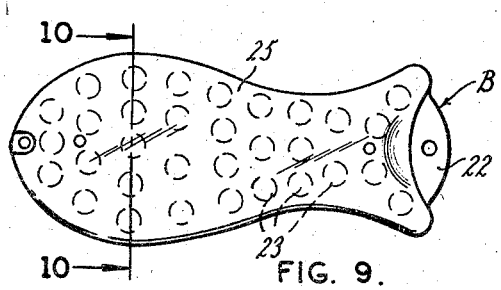
Figure 9 is a top plan view of a modified form of fishing lure constructed in accordance with, and embodying the present invention.
Figure 10:
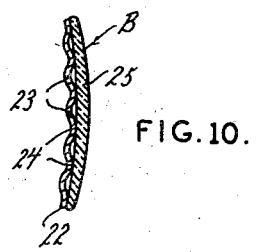
Figure 10 is a sectional view taken along lines 10—10 of Figure 9.

It is also possible to provide a further modified form of fish lure B, as shown in Figures 8 and 9. The fish lure B is similar to the previously described fish lures A, A', comprising a metallic plate 22, similar in peripheral contour and concavo-convex shape, but being provided in its top surface with a plurality of arcuate dimples or indentations 23, the inner surfaces of which are polished in common with the entire upper surface 24 so as to have a brilliant reflective effect. Secured tightly upon the face of the plate 22 is a fluorescent plastic top element 25, substantially identical in every respect with the previously described top element 4.

In use, the lure B will have all of the optical properties previously described in connection with the lure A and will in addition develop a series of bright spots of light in the region of the dimples or indentations 23, thereby simulating the speckled effect resulting when light is reflected from the speckles or scales of the bodies of some types of natural minnows and other small fish found in the waters where game fish abound.

Since synthetic plastic materials of the type discussed above in connection with the top element 4 are ordinarily of relatively light specific gravity, it is preferable to use a relatively heavy metallic plate 1 or, in lieu thereof, a relatively thick plated-on metallic film to impart adequate weight to the lure. In manufacturing trolling lures, however, the additional weight imparted by the metallic plate 1 is not essential. It should also be noted in this connection that, where desired, the abutting faces of the metallic plate 1 and the top element 4 may be sealed together by the use of a transparent adhesive or plastic cement, so that water will not work its way in between the two members. While the use of such adhesives may, for some purposes, be desirable, it has been found that many fishermen prefer to have the top element 4 demountable, so that it can, from time to time, be removed and the polished surface of the plate 1 cleaned and shined up.

It should be understood that changes and modifications in the form, construction, arrangement, and combination of the several parts of the fish lure may be made and substituted for those herein shown and described without departing from the nature and principle of my invention, as defined by the claims.

Having thus described my invention, what I claim and desire to secure by Letters Patent is:

1. A fishing lure comprising a curved metallic plate having an upwardly presented highly polished light reflective convex surface and a light refractive fluorescent element mounted upon said plate in overlying facewise contactive relation upon the polished convex surface, and having an outwardly presented convex surface which is of substantially greater convexity than the convex surface of the metallic plate so that said fluorescent element is substantially thicker in its center portion than it is around its edges.

2. A fishing lure comprising a curved metallic plate having an upwardly presented highly polished light reflective convex surface, and a transparent, light-refractive fluorescent element mounted upon said plate in overlying facewise contactive relation upon the polished convex surface, and having an outwardly presented convex surface which is of substantially greater convexity than the convex surface of the metallic plate so that said fluorescent element is substantially thicker in its center portion than it is around its edges.

References Cited in the file of this patent

UNITED STATES PATENTS

| Number | Name | Date |
| --- | --- | --- |
| 1,326,821 | Ackerman | Dec. 30, 1919 |
| 1,861,905 | Bergstedt | June 7, 1932 |
| 1,881,588 | Horni | Oct. 11, 1932 |
| 1,950,933 | Snell | Mar. 13, 1934 |
| 2,019,959 | Frevert | Nov. 5, 1935 |
| 2,084,526 | Grenier | June 22, 1937 |
| 2,149,464 | Potts | Mar. 7, 1939 |
| 2,163,378 | Horvath | June 20, 1939 |
| 2,163,666 | Carter et al. | June 27, 1939 |
| 2,213,701 | Haselwood | Sept. 3, 1940 |
| 2,311,985 | Heddon | Feb. 23, 1943 |
| 2,486,258 | Chavannes | Oct. 25, 1949 |
| 2,547,308 | Dean | Apr. 3, 1951 |
| 2,570,474 | Novitzky | Oct. 9, 1951 |
| 2,587,264 | Wood | Feb. 26, 1952 |
| 2,641,080 | Wise | June 9, 1953 |